US008655348B2

(12) United States Patent
Zha et al.

(10) Patent No.: US 8,655,348 B2
(45) Date of Patent: Feb. 18, 2014

(54) SYSTEM AND METHOD FOR ACQUIRING NETWORK DATA

(75) Inventors: Wei Zha, Boyds, MD (US); Amir Soltanian, Potomac, MD (US); Tony Kobrinetz, Hoffman Estates, IL (US)

(73) Assignee: PCTEL, Inc., Bloomingdale, IL (US)

( * ) Notice: Subject to any disclaimer, the term of this patent is extended or adjusted under 35 U.S.C. 154(b) by 75 days.

(21) Appl. No.: 13/030,332

(22) Filed: Feb. 18, 2011

(65) Prior Publication Data

US 2012/0214504 A1 Aug. 23, 2012

(51) Int. Cl.
*H04W 24/00* (2009.01)
(52) U.S. Cl.
USPC ......... 455/423; 455/421; 455/422.1; 455/424
(58) Field of Classification Search
CPC .............................. H04W 24/10; H04W 64/00
USPC ........ 455/421, 422.1, 423–425, 435.1–435.3, 455/160.1, 161.1
See application file for complete search history.

(56) References Cited

U.S. PATENT DOCUMENTS

| 4,721,912 | A | 1/1988 | Kaufman et al. |
| 5,592,490 | A | 1/1997 | Barratt et al. |
| 7,971,251 | B2 * | 6/2011 | Sinha ............................... 726/23 |
| 2008/0299910 | A1 * | 12/2008 | Petersen et al. ............ 455/67.11 |
| 2009/0131073 | A1 * | 5/2009 | Carlson et al. ............. 455/456.1 |
| 2010/0103869 | A1 * | 4/2010 | Naden ........................... 370/328 |
| 2010/0311415 | A1 * | 12/2010 | Hamabe et al. ............... 455/425 |

FOREIGN PATENT DOCUMENTS

WO 98/40831 A1 9/1998

OTHER PUBLICATIONS

UE assistance for self-optimizing of network, 3GPP TSG-RAN WG2 R2-072432, NEC, T-Mobile, 25-29, Jun. 2007.
International Preliminary Report on Patentability issued in PCT/US2012/025559, mailed Aug. 29, 2013.
International Search Report and Written Opinion issued in PCT Application PCT/US2012/025559, mailed on Nov. 30, 2012.

* cited by examiner

*Primary Examiner* — Wayne Cai
(74) *Attorney, Agent, or Firm* — The Marbury Law Group, PLLC

(57) ABSTRACT

Systems and methods for acquiring wireless network performance data comprising a user equipment accessible via a wireless network, the user equipment comprising; a receiver, a transmitter, a first processor configured with software executable instructions to cause the user equipment to perform operations comprising; receiving a data acquisition signal via the receiver, sampling a wireless network signal received at the user equipment in response to receiving the data acquisition signal, generating acquired network data, and transmitting the acquired network data via the transmitter, a server accessible via the wireless network, the server comprising, a second processor configured with software executable instructions to cause the server to perform operations comprising; transmitting the data acquisition signal, receiving the acquired network data; and generating network performance data using the acquired network data.

22 Claims, 3 Drawing Sheets

SYSTEM AND METHOD FOR ACQUIRING NETWORK DATA

BACKGROUND

The wireless industry is increasingly focusing on high quality of service, which is a competitive advantage for a wireless service provider. Quality of service may be viewed in terms of network coverage, speech quality, network accessibility, and the number of dropped calls.

To achieve optimal network coverage and performance, wireless cellular carriers, must know the signal strength, interference and data throughput (capacity) at all locations of their network coverage areas. The current capacity test of cellular networks is accomplished with sophisticated drive test equipment that utilizes high-performance scanning receivers. The scanner receiver is typically integrated into a test system comprised of a GPS Receiver (location and time), devices that make and break connections, dedicated hardware for data collection, and a vehicular antenna. A laptop typically serves as the dedicated hardware.

The vehicle travels a predefined route while the scanner receiver collects signals from the antenna and performs protocol-specific measurements. The system transfers the measurement data, together with GPS time and position information, to the laptop or dedicated hardware for display and storage. After a single or a series of drive tests, the logged measurement data may be uploaded to a PC or server for analysis (e.g., post-processing). Application-specific software transforms the drive-test data into a user-friendly format, utilizing maps, graphics, and statistical functions.

The metrics determined from drive test data may be combined with metrics acquired by other scanners or with metrics determined at a different time to provide a picture of the health of the network.

Drive tests provide highly accurate and detailed data regarding the state of a network. However, a drive test is a time consuming exercise that captures data along a specified test route. The serial nature of drive tests results in data being captured at different times. A large network may require drive tests to be taken over several hours or even days.

The data that results from the drive tests provide a significant amount of specific data about the channel characteristics. Understanding the channel characteristics allows for manipulation of the phase and amplitude of each transmitter in order to form a beam (or beams, either in physical space or in vector space (virtual beam/beams)). To correctly form a beam (or beams), the transmitter uses knowledge of the characteristics of the channel. One approach to determining channel characteristics is to send a known signal (reference signal (RS) in LTE) to a mobile device (a user equipment or "UE" in LTE terminology). The mobile device then sends back the channel quality indicator (CQI) measures to the transmitter. The transmitter applies the correct phase and amplitude adjustments to form a beam directed at the mobile device. For beamforming, it is required to adjust the phases and amplitude of each transmitter. However, the CQI feedback from UEs is only with regards to the serving base station sector.

SUMMARY

Embodiments are directed to using user equipments (UEs), such as smartphones, to capture network data from diverse locations in real time. The network data may be delivered to an instant smartscan server (ISS) for processing.

In an embodiment, a UE comprises a data acquisition application that may be controlled by the ISS to acquire network data for all the nearby base station sectors. In another embodiment, the ISS operated by a network service provider may instruct the data acquisition application to acquire network data samples on frequency bands used by competitors of the network service provider.

In another embodiment, the UE is configured to collect network samples for various protocols such as LTE, LTE Advanced, WCDMA, HSPA, CDMA, EVDO and GSM.

DETAILED DESCRIPTION

Figure 1:
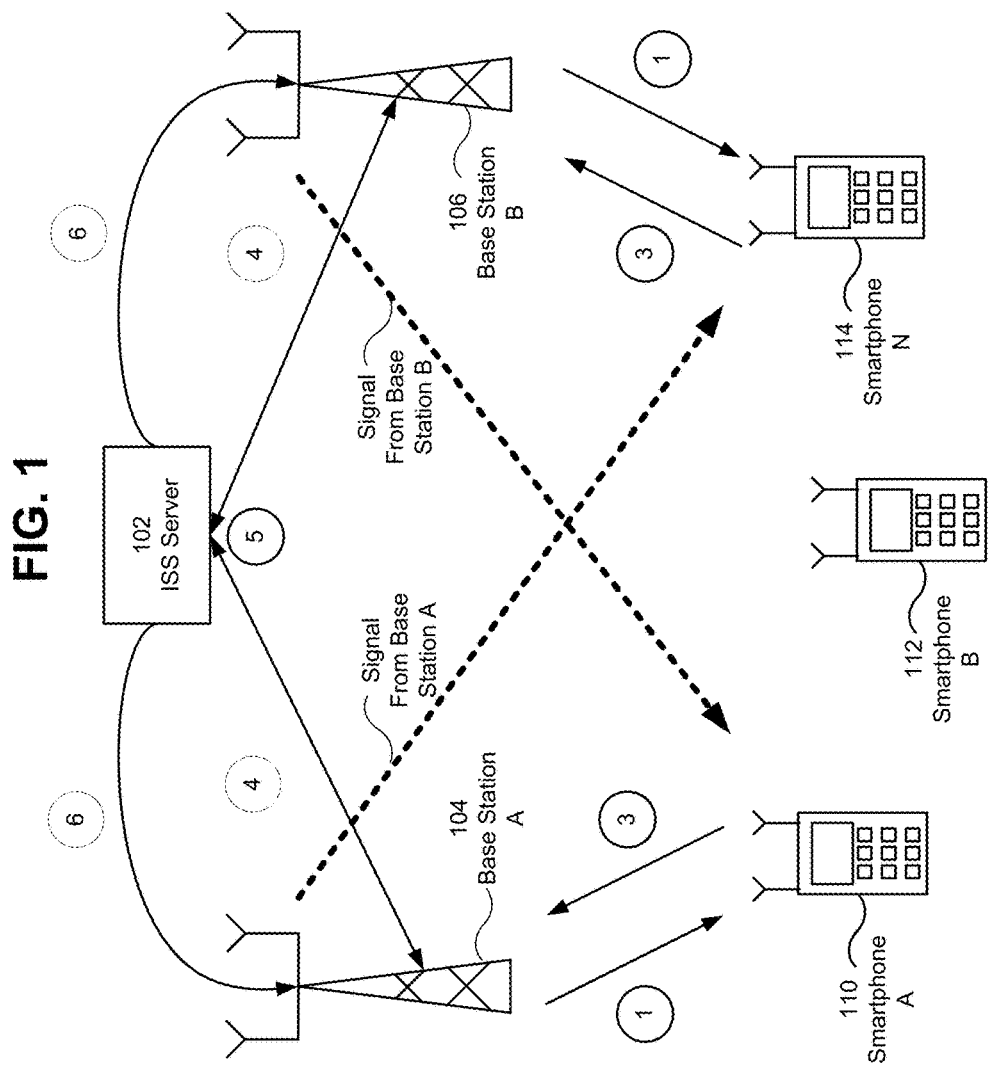
FIG. 1 is a block diagram illustrating an instant smartscan server configured to operate in a LTE MIMO communications system according to an embodiment.

Embodiments are directed to using UEs, such as smartphones, to capture network data from diverse locations in real time. The network data may be delivered to an instant smartscan server (ISS) for processing FIG. 1 is a block diagram illustrating an ISS configured to operate in an LTE MIMO communications system according to an embodiment.

An instant smartscan server (ISS) server 102 communicates with a base station A 104 and a base station B 106. While two base stations are illustrated in FIG. 1, the illustration is not meant to be limiting. Any number of base stations may be connected to the ISS server 102.

Each base station A and B (104 and 106) is configured to communicate with UEs that are in range of the base station signal, such as smartphones A . . . N (110, 112 and 114). As illustrated in FIG. 1, at a point in time, the smartphone A 110 is in communication with base station A 104 and smartphone N 114 is in communication with base station B 106.

In an embodiment, smartphones A and N (110 and 114) are configured with a data acquisition application (see FIG. 2) that is responsive to control signals sent from the base station to which the smartphone is associated with at a point in time. In an embodiment, the time is determined by a reference signal, such as a GPS time.

By way of illustration and not by way of limitation, at the point in time, base stations A and B (104 and 106) instruct selected smartphones A and N (110 and 114) to collect network sample data (circle 1). The data collection may be synchronized for the multiple receiver antennas so that the data will be collected with the same start time and duration. The UE smartphones A and N (110 and 114) may comprise receivers that may be configured to receive signals from sources that use different transmission protocols. The smartphones A and N (110 and 114) collect the network samples at the specified GPS time according to the frequency, bandwidth and time length commands. The network samples may include signals from both base stations A and B (104 and 106).

The smartphones A and N (110 and 114) send the network sample data to their associated base stations with their GPS location information via an LTE reverse link (circle 3), which forwards the network sample data to the ISS server 102 (circle 4).

Figure 2:
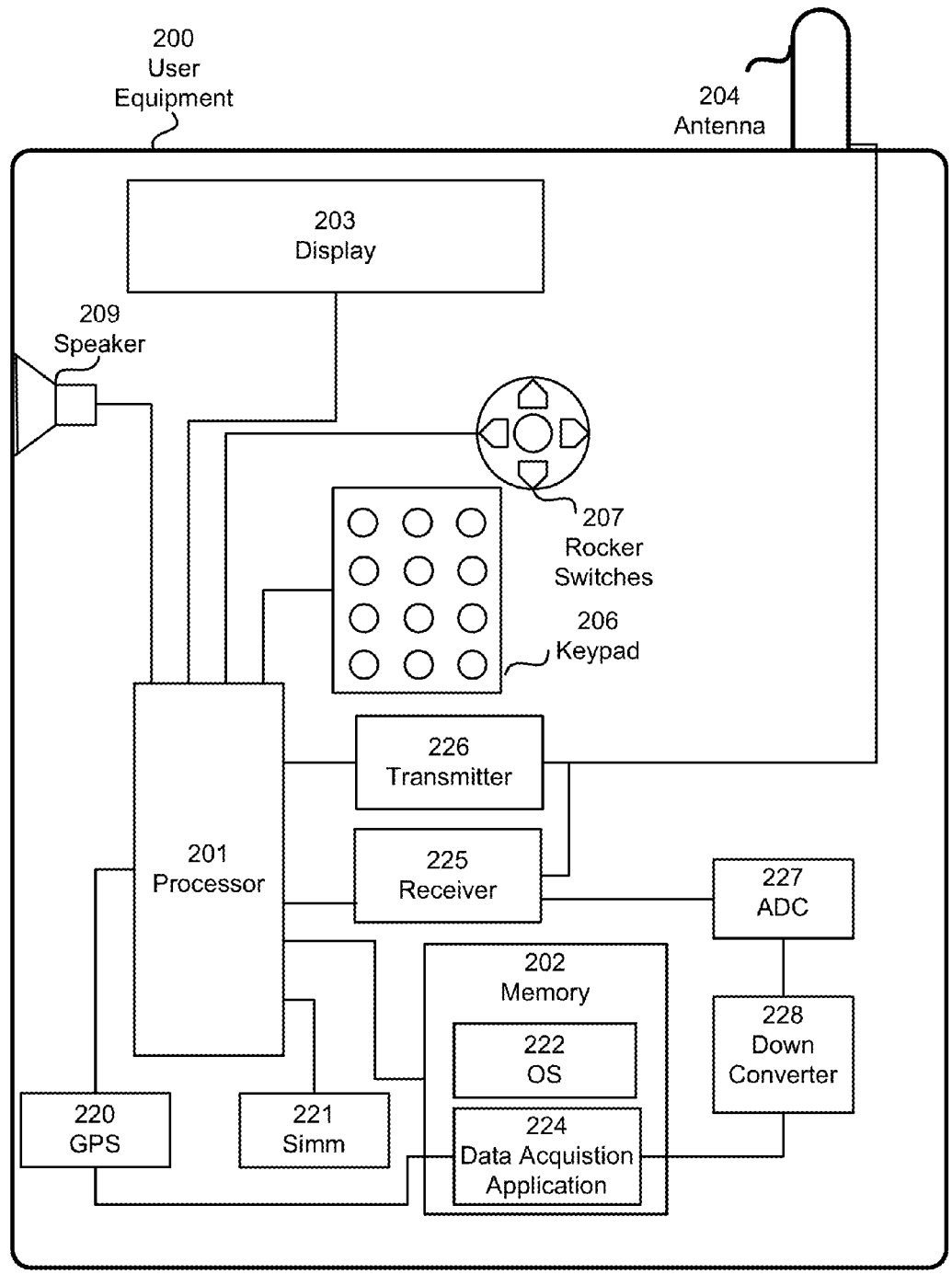
FIG. 2 is a block diagram illustrating a UE according to an embodiment.

FIG. 2 is a block diagram illustrating a UE according to an embodiment.

A UE 200 may include a processor 201 coupled to an internal memory 202, to a display 203 and to a SIM 221 or similar removable memory unit. Additionally, the UE 200 may have an antenna 204 that is connected to a transmitter 226 and a receiver 225 coupled to the processor 201. In some implementations, the receiver 225 and portions of the processor 201 and memory 202 may be used for multi-network communications. In additional embodiments the UE 200 may have multiple antennas 204, receivers 225, and/or transmitters 226. The UE 200 may also include a key pad 206 or miniature keyboard and menu selection buttons or rocker switches 207 for receiving user inputs. The UE 200 may also include a GPS device 220 coupled to the processor and used for determining time and the location coordinates of the UE 200. Additionally, the display 203 may be a touch-sensitive device that may be configured to receive user inputs.

The processor 201 may be any programmable microprocessor, microcomputer or multiple processor chip or chips that can be configured by software instructions (applications) to perform a variety of functions, including the functions of the various embodiments described herein. In an embodiment, the UE 200 may include multiple processors 201, such as one processor dedicated to cellular and/or wireless communication functions and one processor dedicated to running other applications.

Typically, software applications may be stored in the internal memory 202 before they are accessed and loaded into the processor 201. In an embodiment, the processor 201 may include or have access to an internal memory 202 sufficient to store the application software instructions. The memory may also include an operating system 222. In an embodiment, the memory also includes a data acquisition application 224 that provides additional functionality to the UE 200 to permit the UE 200 to acquire network sample data. The network sample data is derived from signals that are provided by the receiver 225 to an analog-to-digital converter (ADC) 227 and a down converter 228 to transform the radio waveform to digitized data samples.

Additionally, the internal memory 202 may be a volatile or nonvolatile memory, such as flash memory, or a mixture of both. For the purposes of this description, a general reference to memory refers to all memory accessible by the processor 201, including internal memory 202, removable memory plugged into the computing device, and memory within the processor 201 itself, including the secure memory.

After a UE, such as, for example, a smartphone, receives a data acquisition command from the ISS server via a basestation, it wakes the data acquisition application 224. The data acquisition 224 application instructs a receiver 205 to tune to the requested radio frequency and instructs the ADC 227 and down-conversion functional blocks 228 to transform the radio waveform to digitized data samples at a specified intermediate sampling clock rate or at an intermediate sampling clock rate internal to the UE. In the case that the required sampling rate is not the same as the UE internal sampling clock rate, such as using a LTE smartphone to acquire CDMA data, the data acquisition application 224 may further run a decimation/integration step to transform the data to the desired sampling rate. The data acquisition application 224 may also run a data compression step to reduce the data size before feeding back to the ISS server. Besides network sample data (including the attenuation applied when collecting the data), the data acquisition application 224 also feedbacks GPS information from GPS receiver 220.

Referring again to FIG. 1, the ISS server 102 analyzes the raw network sample data to acquire various measures of network performance. By way of illustration and not by way of limitation, the ISS server 102 may calculate a received radio waveform power level known as Carrier RSSI and then search nearby basestations by matching all possible Cell-ID synchronization signal patterns for LTE. In the case of other protocols, the signal patterns to be used for the search may be different, for example, the signal patterns may be Pilots for CMDA protocol. After a basestation (or basestation sector) is found, its SINR (signal to interference and noise ratio), Ec/Io, time offset, delay spread, and in the case of MIMO, channel condition number, transmit correlation, receiver correlation, and CQI of all the MIMO transmission modes may be measured/analyzed.

After the measurement/analysis for all the network sample data has been done, the ISS sever 102 maps measurements with GPS map information, and analyzes the network interference between basestations. The ISS server 102 will then provide recommendations to a network operator on how to improve the network efficiency, such as increasing or reducing the transmit power of some basestations (this will affect the MIMO operation as well, as different CINR levels are suited best for different MIMO transmission modes, such as spatial multiplexing or rank-1 pre-coding/transmit diversity, even under the same spatial correlation condition), and changing the tilt angle of some basestation antennas (this trades off coverage versus interference).

The ISS server 102 analyzes the data in ways known in the art and produces measurement results such as condition number, CQI (efficiency) for all LTE MIMO transmission modes, time offset and delay spread (circle 5).

The analyzed data is conveyed to the base stations (circle 6) to provide for optimization of MIMO channel conditions and efficiency UEs represent a lower cost and higher frequency network element than special-purpose scanning receivers. Referred to as User Elements (UEs) in LTE, popular UEs include the Apple iPhone 3G/4G, Motorola DROID, Google phone, RIM Blackberry HTC Droids and so on. Each UE contains antennas, RF paths, ADCs, baseband processors and micro-controllers. In an embodiment, a data acquisition application may be operated on a subset of these UEs to acquire network sample data in near real time. In an embodiment, the data acquisition application may control the UEs antennas, monitor the UEs RF paths, and collect network sample data.

In contrast to the information obtained from CQI feedback from UEs, the embodiments herein utilize UEs as distributed scanners (or sensors) and use the LTE reverse link to send back network sample data. These data may then be analyzed to provide an independent view of the network capacity, to provide UE CQI feedbacks on a selected MIMO mode, and to provide information such as condition number, CQIs for all MIMO modes and all TX antenna to RX antenna paths information with regard to the serving base station sector. Additionally, a cellular carrier may instruct the UEs of its customers to collect network sample data not only on its own band, but also on the bands of its competitors as well.

Figure 3:
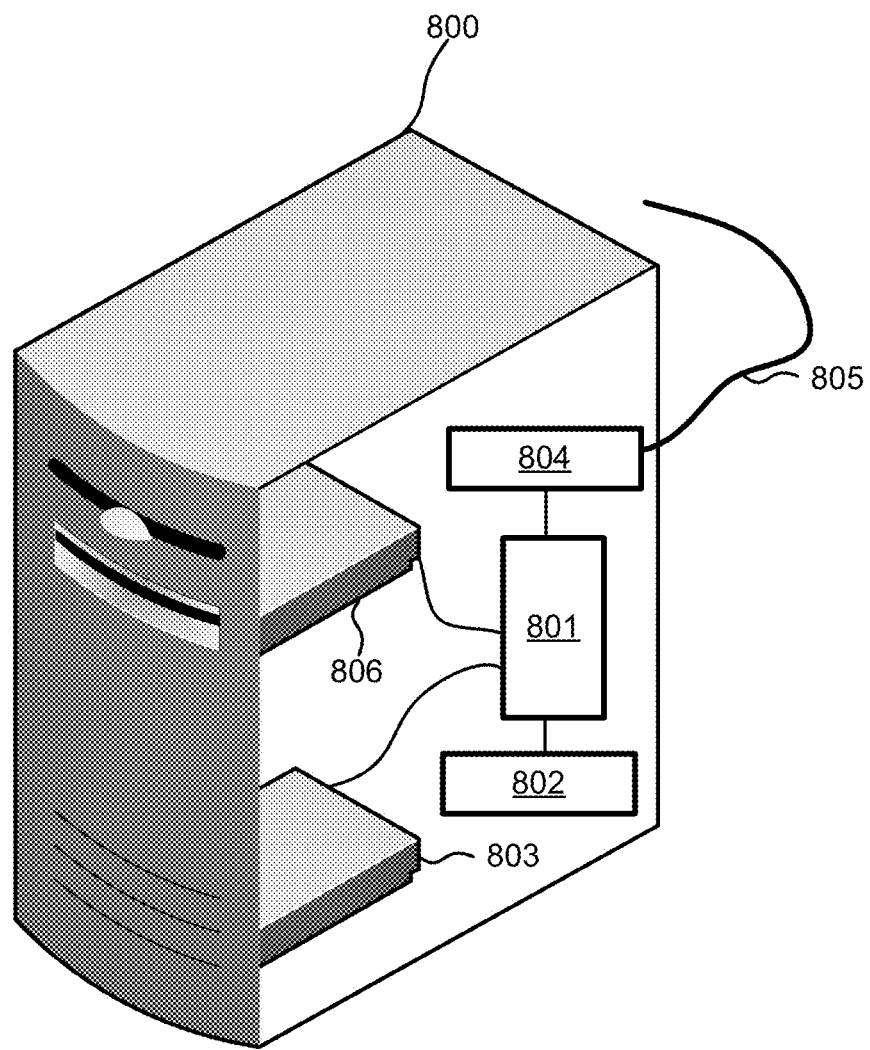
FIG. 3 is a block diagram illustrating a server device.

A number of the embodiments described above may also be implemented with any of a variety of computing devices, such as the server device 800 illustrated in FIG. 3. Such a server device 800 typically includes a processor 801 coupled to volatile memory 802 and a large capacity nonvolatile memory, such as a disk drive 803. The server device 800 may also include a floppy disc drive and/or a compact disc (CD) drive 806 coupled to the processor 801. The server device 800 may also include network access ports 804 coupled to the processor 801 for establishing data connections with network circuits 805 over a variety of wired and wireless networks using a variety of protocols.

The foregoing method descriptions and the process flow diagrams are provided merely as illustrative examples and are not intended to require or imply that the blocks of the various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an," or "the," is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Functionality of various logical blocks may be performed by other logical blocks or circuits. Additionally, functionality of various logical blocks may be performed by additional logical blocks or circuits that are not separately illustrated.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The blocks of a method or algorithm disclosed herein may be embodied in a processor-executable software module, which may reside on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the scope of the invention. Thus, the present invention is not intended to be limited to the embodiments shown herein but is to be accorded the widest scope consistent with the following claims and the principles and novel features disclosed herein.

What is claimed is:

1. A system for acquiring wireless network performance data comprising:
    a smartphone for sending and receiving data via a wireless network, the smartphone comprising;
        a receiver configured to receive and sample signals compliant with a plurality of wireless protocols;
        a transmitter;
        a first processor configured with software executable instructions to cause the smartphone to perform operations comprising;
            receiving a data acquisition signal over the wireless network via the receiver, the data acquisition signal comprising a command directing the smartphone to sample wireless network signals of two different wireless protocols;
            sampling the wireless network signals of two different wireless protocols received at the smartphone in response to receiving the data acquisition signal;
            generating acquired network data; and
            transmitting the acquired network data to a server over the wireless network via the transmitter; and
    a server accessible via the wireless network, the server comprising;
        a second processor configured with software executable instructions to cause the server to perform operations comprising;
            transmitting the data acquisition signal comprising the command over the wireless network;
            receiving the acquired network data over the wireless network; and
            generating network performance data using the acquired network data,
    wherein the wireless network and the server are associated with a first service provider, and at least one of the wireless protocols is a wireless protocol of a network of a competitor service provider.

2. The system of claim 1, wherein the wireless network complies with a wireless protocol selected from the group consisting of LTE, LTE Advanced, WCDMA, HSPA, CDMA, EVDO, and GSM.

3. The system of claim 1, wherein the plurality of wireless protocols are selected from the group consisting of LTE, LTE Advanced, WCDMA, HSPA, CDMA, EVDO, and GSM.

4. The system of claim 1, wherein the smartphone further comprises a GPS receiver; and wherein the acquired network data includes location information of the user equipment.

5. The system of claim 1, wherein the second processor is further configured with software executable instructions to cause the server to perform operations comprising:
   identifying a signal pattern in the acquired network data; and
   using the signal pattern to identify a source of each of the wireless network signals of two different wireless protocols.

6. The system of claim 1, wherein the network performance data is selected from the group consisting of a signal to interference and noise ratio, an Ec/Io, a time offset, a delay spread, a channel condition number, a transmit correlation, a receiver correlation, a RF path, and a channel quality indicator.

7. The system of claim 1, wherein the data acquisition signal causes the smartphone to sample multiple signals and/or multiple frequencies.

8. The system of claim 1, wherein the first processor is further configured with software executable instructions to cause the smartphone to perform operations comprising:
   compressing the acquired network data prior to transmitting the acquired network data.

9. The system of claim 1, wherein the generating of the acquired network data further comprises:
   a decimation and/or integration step to transform the acquired network data to a desired sampling rate.

10. The system of claim 1, wherein the smartphone further comprises a plurality of antennas.

11. The system of claim 1, wherein the second processor is further configured with software executable instructions to cause the server to perform operations comprising;
   synchronizing the receiving of the acquired network data from a plurality of smartphones.

12. A method for acquiring wireless network performance data comprising:
   transmitting from a server via a wireless network a data acquisition signal comprising a command directing a smartphone to sample wireless network signals of two different wireless protocols;
   receiving via the wireless network the data acquisition signal at a smartphone, the smartphone configured to receive and sample signals compliant with a plurality of wireless protocols, the data acquisition signal causing the smartphone to:
      sample wireless network signals of two different wireless protocols received at the smartphone;
      generate acquired network data; and
      transmit via the wireless network the acquired network data;
   receiving the acquired network data at the server via the wireless network; and
   generating network performance data using the acquired network data,
   wherein the wireless network and the server are associated with a first service provider, and at least one of the wireless protocols is a wireless protocol of a network of a competitor service provider.

13. The method of claim 12, wherein the wireless network complies with a wireless protocol selected from the group consisting of LTE, LTE Advanced, WCDMA, HSPA, CDMA, EVDO, and GSM.

14. The method of claim 12, wherein the plurality of wireless protocols are selected from the group consisting of LTE, LTE Advanced, WCDMA, HSPA, CDMA, EVDO, and GSM.

15. The method of claim 12, wherein the data acquisition signal further causes the smartphone to record location information using a GPS receiver; and wherein the generating of the acquired network data further includes incorporating the location information.

16. The method of claim 12, further comprising;
   identifying a signal pattern in the acquired network data; and
   using the signal pattern to identify a source of each of the wireless network signals of two different wireless protocols.

17. The method of claim 12, wherein the network performance data is selected from the group consisting of a signal to interference and noise ratio, an Ec/Io, a time offset, a delay spread, a channel condition number, a transmit correlation, a receiver correlation, a RF path, and a channel quality indicator.

18. The method of claim 12, further comprising the data acquisition signal causing the smartphone to sample multiple signals and/or multiple frequencies.

19. The method of claim 12, further comprising the data acquisition signal causing the smartphone to compress the acquired network data prior to transmitting the acquired network data.

20. The method of claim 12, wherein the generating of the acquired network data further comprises;
   a decimation and/or integration step to transform the acquired network data to a desired sampling rate.

21. The method of claim 12, further comprising, synchronizing the receiving of the acquired network data from a plurality of smartphones.

22. The method of claim 12, further comprising, adjusting a characteristic of the wireless network in response to the network performance data.

* * * * *